US009434264B2

United States Patent
Suzuki et al.

(10) Patent No.: US 9,434,264 B2
(45) Date of Patent: Sep. 6, 2016

(54) SECURE POWER SOURCE STRUCTURE FOR STARTUP OF ELECTRIC POWER SUPPLY DEVICE

(75) Inventors: Takafumi Suzuki, Anjo (JP); Hiroyasu Suzuki, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 624 days.

(21) Appl. No.: 13/617,956

(22) Filed: Sep. 14, 2012

(65) Prior Publication Data

US 2013/0076123 A1 Mar. 28, 2013

(30) Foreign Application Priority Data

Sep. 28, 2011 (JP) .................................. 2011-211927

(51) Int. Cl.
| | |
|---|---|
| B60L 1/00 | (2006.01) |
| B60L 3/00 | (2006.01) |
| H02G 3/00 | (2006.01) |
| B60L 11/18 | (2006.01) |

(52) U.S. Cl.
CPC .......... *B60L 11/1816* (2013.01); *B60L 11/185* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
USPC ........................................................ 307/9.1
See application file for complete search history.

(56) References Cited

U.S. PATENT DOCUMENTS

| | | | | |
|---|---|---|---|---|
| 6,104,160 A | * | 8/2000 | Iwata ..................... | B60L 3/0092 307/66 |
| 8,866,333 B2 | * | 10/2014 | Kamachi ................. | B60L 1/006 307/10.1 |
| 2012/0161701 A1 | * | 6/2012 | Kawamoto .......... | B60L 11/1809 320/109 |
| 2013/0020993 A1 | * | 1/2013 | Taddeo ................. | H02J 7/0027 320/109 |

FOREIGN PATENT DOCUMENTS

JP 11-178234 A 7/1999

\* cited by examiner

*Primary Examiner* — Rexford Barnie
*Assistant Examiner* — Xuan Ly
(74) *Attorney, Agent, or Firm* — Birch, Stewart, Kolasch & Birch, LLP (57) ABSTRACT

A starting power securing structure of an electric power supply device includes a built-in battery that is mounted on the electric power supply device, an operation control portion that is mounted on the electric power supply device and controls the operation of the electric power invert portion, and a discharging control portion that is provided in the electric vehicle and controls the discharging of the driving battery, wherein the driving battery, the operation control portion and the first connection plug are electrically connected, and the electric power of the built-in battery is supplied to the operation control portion and the first connection plug, whereby the electric power is supplied to the discharging control portion via the first connection plug while the electric power invert portion can be operated, and electricity can be transmitted from the electric vehicle to the electric power supply device.

12 Claims, 3 Drawing Sheets

SECURE POWER SOURCE STRUCTURE FOR STARTUP OF ELECTRIC POWER SUPPLY DEVICE

BACKGROUND

The present invention is related to a starting power securing structure of an electric power supply device. Specifically, the present invention relates to a starting power securing structure of an electric power supply device capable of inverting the electric power of an electric vehicle into a utilization electric power of general home electric machinery and supplying the electric power to the electric machinery.

An electric vehicle includes a battery for driving the electric vehicle (hereinafter, referred to as an EV driving battery) capable of storing high-voltage energy. For example, the EV driving battery is charged by supplying the high-voltage energy from a commercial power source facility in a state of connecting a charging gun (a charging connector), which is provided in a charging cable (a connection electric power line) of the commercial power source facility, to the charging connector (a charging connector receptacle) provided in a vehicle.

However, recently, in a case where it is impossible to secure the electric power supply from a power plant during a disaster or the like, there has been an increased demand for using the electric power of the EV driving battery mentioned above as a general home electrical power supply source, for example, an AC 100V electric power supply source. Since the EV driving battery is a battery that stores the high-voltage energy as mentioned above, for example, the electric power of high-voltage direct current of DC 330V, when being used as the general home electrical power supply source, there has been a need to perform DC/AC invert of the electric power and a voltage drop.

For example, Patent Document 1 discloses a home electrical power supply system using an electric vehicle that includes a vehicle storage battery, an electric vehicle that includes an inverter which is connected to the storage battery and performs AC/DC conversion and DC/AC invert, and an inlet portion connected to the inverter, and a charger and discharger including a charging and discharging connecter which is able to be connected to the inlet portion of the electric vehicle and gives and receives the electric power.

However, although the system disclosed in Patent Document 1 mentioned above is able to effectively use the electric power of the vehicle storage battery of the electric vehicle, since there is a need to change a design of the vehicle itself, it was impossible to effectively utilize the electric power of the EV driving battery mounted on the vehicle used in advance, and the system was not generally used. It was possible to only use the electric power of the EV driving battery via a house including the system mentioned above. That is, in the system mentioned above, there was a limitation in effectively using the electric power of the EV driving battery. Furthermore, the electric vehicle used in the system mentioned above, there was a problem in that the vehicle included instruments unnecessary for driving, the vehicle weight increased compared to the electric vehicle of the related art, and the running performance thereof was considerably lowered.

Thus, an electric power supply device is being investigated which performs the DC/AC invert of the electric power transmitted from the electric vehicle via a power cable provided with a plug connectable to a charging connector of the electric vehicle, and lowers the voltage, and outputs the electric power from the electric power output portion to the outside. However, the charging connector is provided between the charging connector of the electric vehicle and the EV driving battery, and in a case where the electric vehicle is supplied with electricity from a commercial power source facility, the device is configured so that the conditions such as the connection state due to a bidirectional communication and the battery remaining quantity of the EV driving battery are satisfied for the first time and the charging connector and the EV driving battery attain the electrically connected state. Since the electric power supply device mentioned above is connected to the charging connector of the electric vehicle, the high-voltage energy of the EV driving battery is input. Thus, even in the connection between the electric power supply device and the electric vehicle, securing of high stability desired. For example, by performing the bidirectional communication by the electric power supply device and the electric vehicle, it is possible to reliably determine the connection state between the electric power supply device and the electric vehicle. In this manner, in order to perform bidirectional communication, there is a need for a power source for operating the instrument in the electric power supply device.

PATENT DOCUMENT

[Patent Document 1] JP-A-11-178234

SUMMARY

It is therefore one advantageous aspect of the present invention to provide a starting power securing structure of an electric power supply device capable of securing the power source for operating the device and more reliably starting the device.

According to one advantage of the invention, there is provided an electric power supply device adapted to be connected to a charging connector of an electric vehicle, comprising:

a first power cable including a first connection plug configured to be connected to a charging connector;

an electric power invert portion configured to perform a DC/AC inversion of an electric power supplied from an electric vehicle via the first power cable and to lower a voltage of the electric power;

an electric power output portion configured to output the electric power from the electric power invert portion;

an operation control portion configured to control an operation of the electric power invert portion; and a built-in battery configured to supply an electric power of the built-in battery to the operation control portion and the first connection plug in a state of being electrically connected to the operation control portion and the first connection plug, whereby the electric power invert portion becomes performable, and the electric power is supplied to a discharging control portion of the electric vehicle via the first connection plug so that the electric power can be transmitted from the electric vehicle to the electric power supply device.

The electric power supply device may further comprise a second power cable including a second connection plug configured to be connected to an interior electric power output portion provided in an interior of the electric vehicle, wherein the operation control portion and the first connection plug are configured to be electrically connected to the electric vehicle via the second power cable, in a case where a voltage of the built-in battery is higher than or equal to a voltage of an auxiliary machine battery of the electric vehicle, the electric power of the built-in battery is supplied to the operation control portion and the first connection plug, and in a case where the voltage of the built-in battery is lower than the voltage of the auxiliary machine battery, an electric power of the auxiliary machine battery is supplied to the operation control portion and the first connection plug.

The electric power supply device may be configured such that: the built-in battery is configured to be electrically connected to the battery via the second power cable, and the built-in battery is configured to be charged by the electric power of a driving battery of the electric vehicle via the first power cable or charged by the electric power of the auxiliary machine battery via the second power cable.

The electric power supply device may further comprise an electric power line electrically connecting the built-in battery with the operation control portion and the first connection plug, wherein the second power cable is electrically connected to the electric power line.

The electric power line may be stored in the first power cable.

The electric power supply device may further comprise a diode provided between the second connection plug and a connection location where the second power cable is electrically connected to the electric power line.

According to another advantage of the invention, there is provided a starting power securing structure of an electric power supply device which includes an electric power invert portion that performs a DC/AC invert of the electric power supplied from an electric vehicle via a first power cable provided with a first connection plug connectable to a charging connector of the electric vehicle and lowers a voltage of the electric power, and an electric power output portion that outputs the electric power subjected to the DC/AC invert and the voltage drop to an outside, the structure comprising:

a built-in battery mounted on the electric power supply device and configured to store an electric power;

an operation control portion provided in the electric power supply device and configured to control an operation of the electric power invert portion; and a discharging control portion provided in the electric vehicle and configured to control a discharging of a driving battery mounted on the electric vehicle to the charging connector, wherein the built-in battery is configured to supply the electric power stored in the built-in battery of the operation control portion and the first connection plug in a state of being electrically connected to the operation control portion and the first connection plug, whereby the electric power is supplied to the discharging control portion via the first connection plug, the electric power invert portion become performable so that the electric power can be transmitted from the electric vehicle to the electric power supply device.

The starting power securing structure of the electric power supply device may further comprise a second power cable provided with a second connection plug configured to be connected to an interior electric power output portion which outputs an electric power stored in an auxiliary machine battery mounted on the electric vehicle to an interior of the electric vehicle, wherein the auxiliary machine battery is configured to be electrically connected to the operation control portion and the first connection plug via the second power cable, in a case where a voltage of the built-in battery is higher than or equal to a voltage of the auxiliary machine battery, the electric power of the built-in battery is supplied to the operation control portion and the first connection plug, and in a case where the voltage of the built-in battery is lower than a voltage of the auxiliary machine battery, the electric power of the auxiliary machine battery is supplied to the operation control portion and the first connection plug.

The starting power securing structure of the electric power supply device may be configure such that: wherein the auxiliary machine battery is configured to be electrically connected to the built-in battery via the second power cable, and the built-in battery is configured to be charged by an electric power of a driving battery via the first power cable or charged by the electric power of the auxiliary machine battery via the second power cable.

The starting power securing structure of the electric power supply device may further comprise an electric power line electrically connecting the built-in battery with the operation control portion and the first connection plug, wherein the second power cable is electrically connected to the electric power line.

The electric power line may be stored in the first power cable.

The starting power securing structure of the electric power supply device may further comprise a diode provided between the second connection plug and a connection location where the second power cable is electrically connected to the electric power line.

DETAILED DESCRIPTION OF EXEMPLIFIED EMBODIMENTS

An embodiment for carrying out a starting power securing structure of an electric power supply device according to the present invention will be described.

The starting power securing structure of the portable electric power supply device according to the first embodiment of the present invention will be described with reference to FIGS. 1 and 2. In addition, FIG. 1 shows a state of supplying the electric power of an electric vehicle driving battery mounted on an electric vehicle to the outside via a portable electric power supply device.

Figure 1:
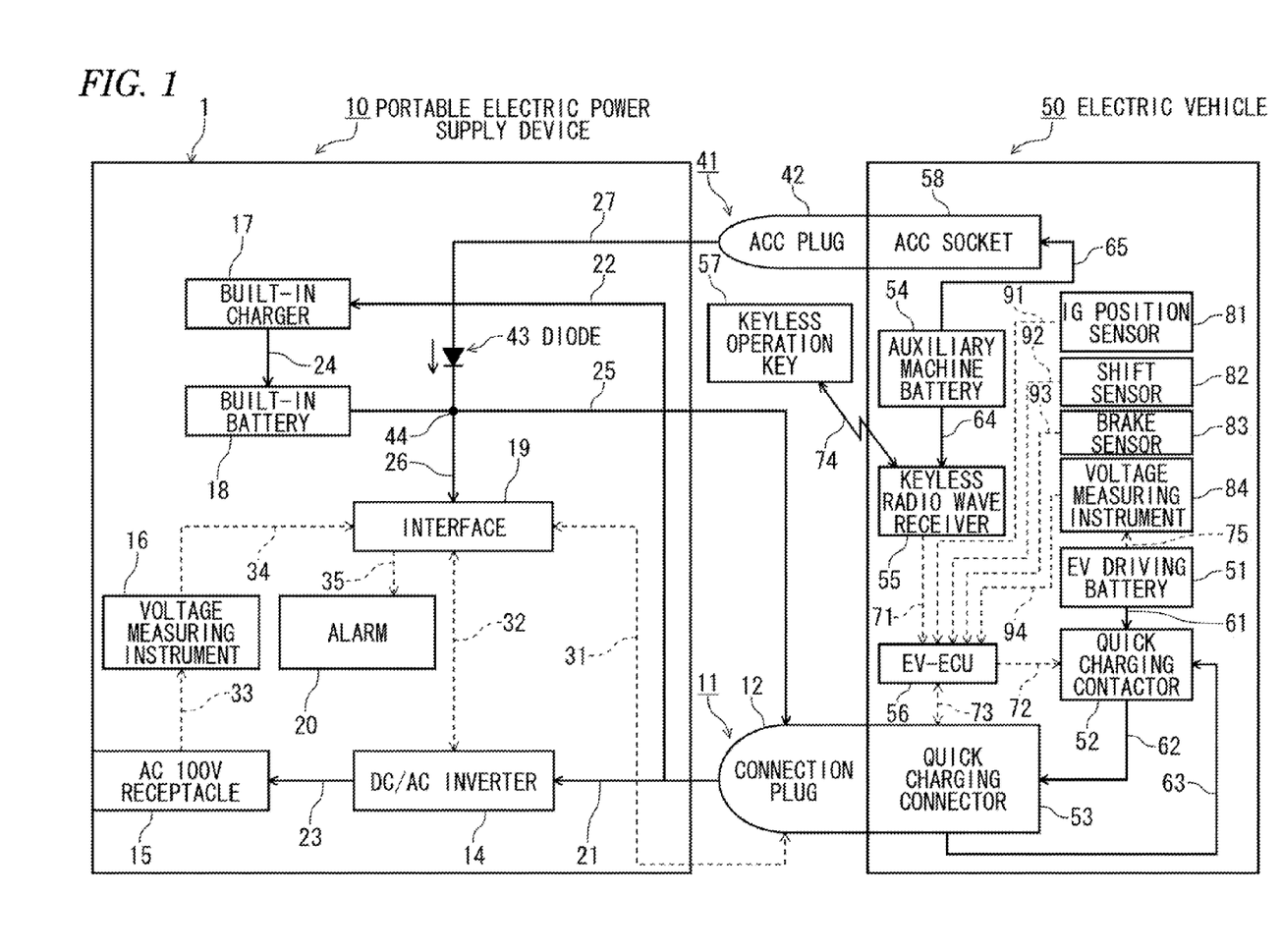
FIG. 1 is an explanatory diagram of a starting power securing structure of a portable electric power supply device according to a first embodiment of the present invention.
Figure 2:
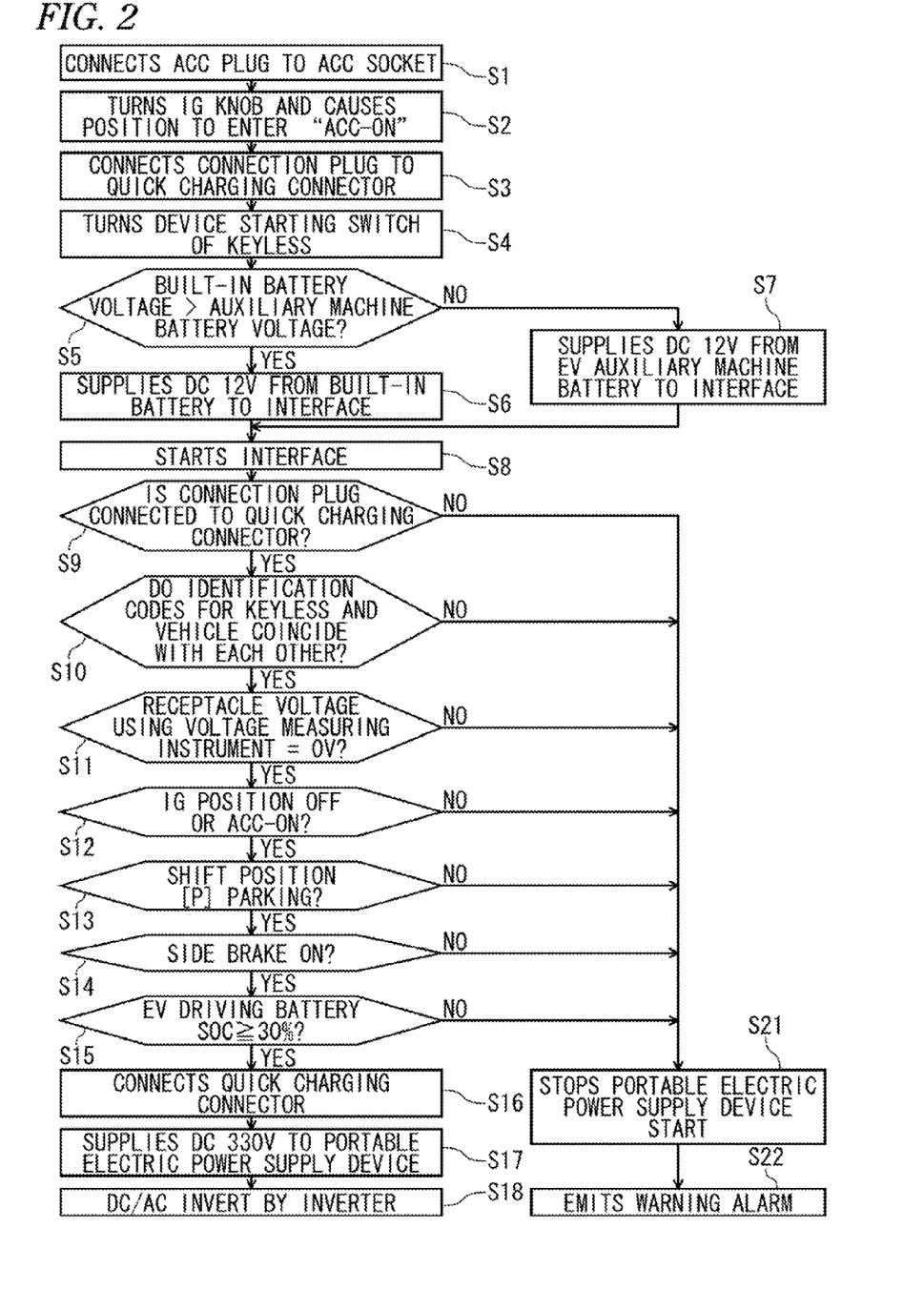
FIG. 2 is a diagram that shows a control flow using the starting power securing structure of the portable electric power supply device according to the first embodiment of the present invention.

As shown in FIG. 1, the starting power securing structure of the portable electric power supply device according to the present embodiment includes a portable electric supply device 10. The portable electric power supply device 10 includes a first power cable 11 which is provided with a connection plug (a portable electric power supply device side connector) 12 connectable to a quick charge connector (a vehicle side connector receptacle) 53 of an electric vehicle 50 at a leading side thereof.

The electric vehicle 50 includes the quick charge connector 53 mentioned above, an electric vehicle driving battery (hereinafter, referred to as an EV driving battery) 51, and an electric vehicle control device (hereinafter, referred to as an EV-ECU) 56.

The EV driving battery 51 is, for example, a battery secondary battery) capable of storing the electric power of the high-voltage direct current of DC 330 V. An electric motor (not shown) of the electric vehicle 50 is driven by the electric power stored in the battery 51.

For example, the quick charging connector 53 is a terminal that can be connected to a quick charger side connector of a quick charger of the related art based on JEVS (Japan Electric Vehicle Standard) G105 and can perform a CAN (Controller Area Network) communication with the quick charger side connector of the quick charger. The quick charging connector 53 is connected to the EV driving battery 51 via the quick charging contactor 52. Specifically, the quick charging connector 53 and the quick charging contactor 52 are connected to each other by a DC 330V line (a second electric power line) 62. The quick charging contactor 52 and the EV driving battery 51 are connected to each other by a DC 330V line (a first electric power line) 61. Furthermore, the quick charging connector 53 and the quick charging contactor 52 are connected to each other by a DV 12V line (a third electric power line) 63. The quick charging contactor 52 is an instrument that switches a closed circuit and an open circuit between the EV driving battery 51 and the quick charging connector 53 by supplying the electric power of a built-in battery 18 or an auxiliary machine battery 54 mentioned below via the connection plug 12, the quick charging connector 53, and the DC 12V line 63, and is controlled by the signal from the EV-ECU 56. That is, the quick charging contactor 52 forms a discharging control portion that controls the discharging of the EV driving battery 51.

The EV-ECU 56 is a device that controls the instruments of the electric vehicle 50 such as the quick charging contactor 52 and the quick charging connector 53. The EV-ECU 56 is connected to the quick charging contactor 52 by a signal line 72, and is connected to the quick charging connector 53 by a signal line 73 capable of performing bidirectional communication.

Furthermore, the EV-ECU 56 is each connected to an ignition position sensor (hereinafter, referred to as an IG position sensor) 81, a shift sensor 82, a brake sensor 83, and a voltage measuring instrument (a battery remaining quantity measuring instrument) 84 by signal lines 91, 92, 93 and 94. The IG position sensor 81 is a sensor for detecting a position of an ignition knob, and transmits the detection result to the EV-ECU 56 by the signal line 91. As a detection result of the IG position sensor 81, an ACC-OFF position (OFF position), an ACC-ON position, and an ON position are included. The shift sensor 82 is a sensor for detecting a shift lever operation and transmits the detection value to the EV-ECU 56 by the signal line 92. As the detection value of the shift sensor 82, an advancement position (including a drive range, a second range or the like), a retraction position (a reverse range), a parking position (a parking range), and a neutral position (a neutral range) are included. The brake sensor 83 is a sensor for detecting a hand brake position and transmits the detection value to the EV-ECU 56 by the signal line 98. As the detection value of the brake sensor 83, a brake ON position and a brake OFF position are included. The voltage measuring instrument 84 is an instrument that measures a battery remaining quantity (SOC: State Of Charge) of the EV driving battery 51, and transmits the voltage measurement value of the EV driving battery 51 to the EV-ECU 56 by the signal line 94.

The electric vehicle 50 mentioned above further includes a keyless radio wave receiver 55. The keyless radio wave receiver 55 is an instrument that receives a radio wave signal 74 which is wirelessly sent from a keyless operation key 57 of the electric vehicle 50. That is, the keyless radio wave receiver 55 forms a keyless signal receiver. The keyless operation key 57 includes an open and close switch capable of being remotely operated by wirelessly sending a door open and close signal of the electric vehicle 50, a starting switch capable of remotely operating the starting of the portable electric power supply device 10 by wirelessly sending the starting signal including an identification code of the keyless operation key 57 or the like. That is, the keyless operation key 57 is a portable electron key that wirelessly transmits the radio wave signal 74 using the respective switches, and forms a keyless operation device. The keyless radio wave receiver 55 is connected to the auxiliary machine battery 54 via a DC 12 V line (a fourth electric power line) 64, and is connected to the EV-ECU 56 via the signal line 71. The auxiliary machine battery 54 is, for example, a battery (a secondary battery) capable of storing the electric power of the low-voltage direct current of DC 12V. The auxiliary machine battery 54 is connected to an ACC socket 58 via a DC 12V line (a fifth electric power line) 65, and is also connected to an auxiliary machine class (not shown) such as an electric field instrument (a controller, a lamp, and an air conditioner) via an electric power line (not shown). The ACC socket 58 is a terminal that is provided in a vehicle interior and is capable of outputting DC 12V. That is the ACC socket 58 forms a vehicle interior electric power output portion.

The electric vehicle 50 includes the instrument mentioned above, whereby, in a state where at least the quick charging connector 53 is connected to the connection plug 12 of the portable electric power supply device 10, then the keyless radio wave receiver 55 receives the starting signal due to the above-mentioned starting switch ON of the keyless operation key 57, the signal is transmitted to the EV-ECU 56. The EV-ECU 56 determines the connection state between the connection plug 12 and the quick charging connector 53 when receiving the signal. For example, the EV-ECU 56 determines the connection state by presence or absence of the reception of the signal due to the CAN communication between the connection plug 12 and the quick charging connector 53. In a case of receiving the signal, the EV-ECU 56 determines that the connection plug 12 is connected to the quick charging connector 53, and transmits the connection permission signal to the quick charging connector 52 via the signal line 72. When receiving the connection permission signal, the quick charging connector 52 forms a closed circuit between the EV driving battery 51 and the quick charging connector 53. As a result, the electric power (DC 330V) stored in the EV driving battery 51 is sent to the portable electric power supply device 10 side via the quick charging contactor 52 and the quick charging connector 53. On the other hand, in a case of not receiving the signal, the EV-ECU 56 determines that the connection plug 12 is not connected to the quick charging connector 53, and the quick charging contactor 52 forms a closed circuit between the EV driving battery 51 and the quick charging connector 53. As a result, the electric power is not transmitted from the electric vehicle 50 to the portable electric power supply device 10.

The portable electric power supply device 10 mentioned above has a housing 1. The housing 1 is provided with, for example, a conveying instrument such as a caster wheel (not shown) and a traction handle (not shown). The portable electric power supply device 10 includes a first power cable 11 in which a leading end portion side having the connection plug 12 provided in the leading end portion is extended to the outside of the housing 1, a second power cable 41 in which a leading end portion side having an ACC plug 42 provided in the leading end portion is extended to the outside of the housing 1, a DC/AC inverter 14, an AC 100V receptacle 15, the built-in battery 18 and an interface (a control device for the portable electric power supply device) 19. The connection plug 12 forms a first connection plug, and the ACC plug 42 forms a second connection plug.

The connection plug 12 mentioned above is a terminal that has the same specification as that of the quick charger side connector of the quick charger mentioned above, is able to perform the CAN communication mentioned above with the quick charging connector 53 of the electric vehicle 50, and is able to be connected to the quick charging connector 53.

The DC/AC inverter 14 is an instrument that performs the DC/AC invert and voltage drop of the electric power of the high-voltage direct current into the electric power usable in the general house electric instrument, and inverts, for example, the electric current of the high-voltage direct, power of DC 330V into an electric power of a AC 100V low-voltage alternating current. That is, the DC/AC inverter 14 forms the electric power invert portion. The DC/AC inverter 14 is connected to the connection plug 12 by the DC 330V line to first electric power line) 21, and is connected to the 100V receptacle 15 by the AC 100V line (a third electric power line) 23.

The AC 100V receptacle 15 is a receptacle that is able to output the electric power of AC 100V to the outside and has a port or a plurality of ports. The general house electric instrument is supplied with the AC 100V electric power by fitting the plug of the power cable of the general house electric instrument to the receptacle 15 of AC 100V. That is, the AC 100V receptacle 15 forms the electric power output portion. The AC 100V receptacle 15 is connected to a voltage measuring instrument 16 via a signal line 33. The voltage measuring instrument 16 is connected to the interface 19 via the signal line 34. As a result, the voltage measuring instrument 16 measures the reverse current voltage flowing back from the outside to the DC/AC inverter 14 via the 100V receptacle 15, and transmits the reverse current voltage measurement value to the interface 19 via the signal line 34.

The interface 19 is a device that controls each instrument of the portable electric power supply device 10. The interface 19 is connected to the connection plug 12 by the signal line 32 capable of performing bidirectional communication, and is connected to the DC/AC inverter 14 by the signal line 32 capable of performing bidirectional communication. The interface 19 is connected to an alarm 20 by the signal line 35. The alarm 20 is a warning device that generates an alarm based on the input signal. The interface 19 determines whether or not the reverse current voltage measurement value is 0V. In a case where the reverse current voltage measurement value is 0V, the portable electric power supply device 10 transmits the signal present in the starting, state to the EV-ECU 56 via the signal line 31, the CAN communication, and the communication line 73. On the other hand, in a case where the reverse current voltage measurement value is not 0V, an alarm starting signal for starting the alarm 20 is send to the alarm 20 via the signal line 35, and a stop signal far stopping the operation of the DC/AC inverter 14 is sent to the DC/AC inverter 14 via the signal line 32. That is, the interface 19 forms the operation control portion that controls the operation of the DC/AC inverter 14.

The built-in battery 18 is, for example, a battery (a secondary battery) capable of storing the electric power of the lower-voltage electric current of DC 12V. The built-in battery 18 is connected to the built-in charger 17 via the DC 12V line (a fourth electric power line) 24. The built-in charger 17 is connected to the connection plug 12 via the DC 330V line (a second electric power line) 22 and the DC 330V line 21. The built-in battery 18 is connected to the connection plug 12 via a DC 12V line (a fifth electric power line) 25. A DC 12V line (a sixth electric power line) 26 is connected to the DC 12V line (the fifth electric power line) 25. The other end of the DC 12V line 26 is connected to the interface 19. That is, the built-in battery 18 is connected to the interface 19 via the DC 12V line 25 and the DC 12V line 26.

The ACC plug 42 is a terminal that is able to be connected to the ACC socket 58 of the electric vehicle 50. The ACC plug 42 is connected to a connection place 44 of the DC 12V line 25 and the DC 12V line 26 via the DC 12V (the sixth electric power line) 27. By turning the ignition and matching the ACC plug 42 with the ACC-ON position in a state of being connected to the ACC socket 58, the electric power (DC 12V) stored in the auxiliary machine battery 54 is supplied to the connection place 44 via the ACC socket 58, the ACC plug 42, and the DC 12V line 27. As a result, the built-in battery 18 is charged by the electric power of the EV driving battery 51, or is charged by the electric power of the auxiliary machine battery 54 via the second power cable 41. In this manner, since there are two routes for charging the electric power in the built-in battery 18, and there are two supply sources of the electric power stored in the built-in battery 18, the electricity storing operation of the built-in battery 18 is doubled. As a result, reliability of the electricity storing operation of the built-in battery 18 is improved, and it is possible to more reliably secure the electric power supply source to the interface 19 and the connection plug 12 serving as the instrument for starting the portable electric power supply device 10. In a case where the voltage of the built-in battery 18 is higher than or equal to the voltage of the auxiliary machine battery 54, the electric power of the built-in battery 18 is supplied to the interface 19 and the connection plug 12. In a case where the voltage of the built-in battery 18 is lower than the voltage of the auxiliary machine battery 54, the electric power of the auxiliary machine battery 54 is supplied to the interface 19 and the connection plug 12. In this manner, there are two electric power supply sources to the interface 19 and the connection plug 12, whereby it is possible to more reliably secure the electric power supply source to the interface 19 and the connection plug 12 serving as the instrument for starting the portable electric power supply device 10. Furthermore, since the DC 12V line 27 of the second power cable 41 is connected to the connection place 44 of the DC 12V line 25 and the DC 12V line 26, it is possible to supply the electric power of the built-in battery 18 or the auxiliary machine battery 54 to the interface 19 and the connection plug 12 using a simple wiring. Furthermore, the electric power supplied to the interface 19 is also supplied to the DC/AC inverter 14 and the alarm 20 via the DC 12V line mentioned above. A diode 43 is provided between the connection place 44 and the ACC plug 42 in the DC 12V line 27. As a result, an occurrence of reverse current voltage flowing back from the connection place 44 to the ACC plug 42 is prevented.

In addition, the DC 330V line 21, the DC 12V line 25, and the signal line 31 is stored in the first power cable 11. As a result, the respective lines 21, 25 and 31 are collected in one first power cable 11, a work of connecting the connection plug 12 of the first power cable 11 to the quick charging connector 53 or the like becomes easier, and workability becomes satisfactory. The DC 12V line 27 is stored in the second power cable 41.

Herein, in regard to a control flow using the starting power securing structure of the portable electric power supply device having the structure mentioned above, as a "first Embodiment", a starting control flow will be described with reference to FIG. 2 in a case where the electric power is supplied to the interface 19 from the built-in battery 18 of the portable electric power supply device 10 or the auxiliary machine battery 54 of the electric vehicle 50 to start the batteries. Firstly, a person (a user) who uses the portable electric power supply device 18 connects the ACC plug 42 of the second electric power cable 41 to the ACC socket 58 of the electric vehicle 50 (a step S1).

Next, the above-mentioned ignition knob of the electric vehicle 50 is turned to make the position thereof enter the ACC-ON (a step S2).

Next, the connection plug 12 of the first electric power cable 11 is connected to the quick charging connecter 53 of the electric vehicle 50 (a step S3).

Next, the starting switch of the keyless operation key 57 is turned ON (a step S4). As a result, the keyless operation key 57 wirelessly transmits the starting signal including the identification code of the keyless operation key 57 to the electric vehicle 50. The keyless radio wave receiver 55 receives the starting signal and transmits the starting signal to the EV-ECU 56.

Next, it is determined whether the voltage of the built-in battery 18 is equal to or higher than the voltage of the auxiliary machine battery 54 (a step S5. In addition, in the present embodiment, as mentioned above, since the electric power can be supplied from the built-in battery 18 and the auxiliary machine battery 54 to the interface 19, the electric power is automatically supplied from the high-voltage side of the built-in battery 18 and the auxiliary machine battery 54 to the interface 19. In a case where the voltage of the built-in battery 18 is equal to or higher than that of the auxiliary machine battery 54, the process proceeds to a step S6, and in a case where the voltage of the built-in battery 18 is lower than voltage of the auxiliary machine battery 54, the process proceeds to a step S7. In addition, in a case where the voltage of the built-in battery 18 is equal to that of the auxiliary machine battery 54, the electric power supplied from the built-in battery 18 is automatically supplied to the interface 19.

At the step S6 the DC 12V (the electric power) is supplied from the built-in battery 18 to the interface 19. Next, the process proceeds to a step S8.

On the other hand, at the step S7 the DC 12V (the electric power) is supplied from the auxiliary machine battery 54 to the interface 19 via the ACC socket 58 and the ACC plug 42. Next, the process proceeds to at step S8.

At the step S8 the interface 19 is started.

Next, the interface 19 and the EV-ECU 56 each determine the connection state between the connection plug 12 and the quick charging connector 53 (a step S9). For example, the interface 19 and the EV-ECU 56 each determine the connection state by presence car absence of the reception of the signal due to the CAN communication between the connection plug 12 and the quick charging connector 53. In a case where the signal is received, it is determined that the connection plug 12 is connected to the quick charging connector 53, and the process proceeds to a step S10. In a case where the signal is not received, it is determined that the connection plug 12 is not connected to the quick charging connector 53, and the process proceeds to a step S21.

At a step S10, the EV-ECU 56 determines whether or not the identification code (the identification ID) of the keyless operation key 57 wirelessly sent by the keyless operation key 57 coincides with the identification code (the identification ID) of the electric vehicle 50. Herein, the identification code of the keyless operation key 57 is sent to the EV-ECU 56 via the keyless radio wave receiver 55 together with the starting signal by turning the starting switch of the keyless operation key 57 ON at the step S4. The identification code of the electric vehicle 50 is registered in an identification code registration portion of the EV-ECU 56 in advance. In an identification code comparison portion in the EV-ECU 56, the comparison between the identification code of the keyless operation key 57 and the identification code of the electric vehicle 50 is performed. In a case where the identification codes coincide with each other, the process proceeds to a step S11. In a case where the identification codes do not coincide with each other, the process proceeds to a twenty first one step S21.

At an step S11, the interface 19 determines whether or not the reverse current voltage measurement value of the AC 100V receptacle 15 using the voltage measuring instrument 16 is 0V. In a case where the reverse current value is 0V, the process proceeds to a step S12. At this time, the interface 19 transmits a device side before starting preparation completion signal, in which the portable electric power supply device 10 is in a startable state, to the EV-ECU 56 via the signal line 31, the CAN communication mentioned above, and the signal line 73. On the other hand, in a case where the reverse current voltage measurement value is not 0V, the process proceeds to a step S21.

At the step S12, the EV-ECU 56 determines whether or not the detection result using an IG position sensor 81 is in an OFF position or an ACC-ON position or in other positions. In a case where the detection result is the OFF position or the ACC-ON position, the process proceeds to a step S13. In a case where the detection result is neither the OFF position nor the ACC-ON position, the process proceeds to the step S21.

At the step S13, the EV-ECU 56 determines whether or not the detection value using the shift sensor 82 is in a parking position (a parking zone). In a case where the detection value is in the parking position, the process proceeds to a step S14. In a case where the detection value is not in the parking position, the process proceeds to the step S21.

At the step S14, the EV-ECU 56 determines whether or not the detection value using the brake sensor 83 is in a brake ON position. In a case where the detection value is in the brake ON position, the process proceeds to the step S15. In a case where the detection value is not in the brake ON position, the process proceeds to the step S21.

At the step S15, the EV-ECU 56 determines whether or not the battery remaining quantity SOC of the EV driving battery 51 using the voltage measuring instrument 84 is equal to or greater than 30%. In a case where the battery remaining quantity SOC of the EV driving battery 51 is equal to or greater than 30%, the process proceeds to a step S16. In a case where the battery remaining quantity SOC of the EV driving battery 51 is smaller than 30%, the process proceeds to the step S21. As a result, the electric power required for starting the electric vehicle 50 is secured.

At the step S21, the interface 19 and the EV-ECU 56 stop the starting of the portable electric power supply device 10.

The interface 19 transmits the stop signal for stopping the operation of the DC/AC inverter 14 to the DC/AC inverter 14. As a result, the starting of the DC/AC inverter 14 is stopped. The EV-ECU 56 transmits the signal to the quick charging contactor 52. As a result, the quick charging contactor 52 forms a closed circuit between the EV driving battery 51 and the quick charging connector 53. That is, the starting of the portable electric power supply device 10 is stopped, and the transmission of the electric power from the electric vehicle 50 to the portable electric power supply device 10 is stopped. Next, at a step S22, the interface 19 transmits the signal to the alarm 20 via the signal line 35. When the alarm 20 receives the signal, the alarm 20 is operated based on the signal. A warning alarm is issued by the alarm 20.

Next, at the step S16, the EV-ECU 56 transmits the connection permission signal to the quick charging contactor 52, and the quick charging contactor 52 forms a closed circuit between the EV driving battery 51 and the quick charging connector 53 based on the signal. As a result, the electric power stored in the EV driving battery 51 is supplied to the portable electric power supply device 10 via the quick charging contactor 52 and the quick charging connector 53. That is, the electric power of DC 330V is transmitted from the electric vehicle 50 to the portable electric power supply device 10 (a step S17).

Next, at a step S18, the electric power of DC 330V transmitted to the portable electric power supply device 10 is inverted into the electric power of AC 100V by the DC/AC inverter 14. As a result, a state capable of supplying AC 100V from the AC 100V receptacle 15 of the portable electric power supply device 10 to the outside is obtained.

As mentioned above, according to the starting power securing structure of the electric power supply device according to the "first embodiment", by electrically connecting the built-in battery 18, the interface 19 and the connection plug 12 using the DC 12V line 25 and the DC 12V line 26 and supplying the electric power of the built-in battery 18 to the interface 19 and the connection plug 12, the electric power is supplied to the quick charging contactor 52 via the connection plug 12, the quick charging connector 53 and the DC 12V line 63 while the DC/AC inverter 14 can be operated, the quick charging contactor 52 forms a closed circuit between the EV driving battery 51 and the quick charging connector 53, and it is possible to transmit the electric power of the EV driving battery 51 to the portable electric power supply device 10 via the quick charging connector 53. In this manner, it is possible to secure the power source for starting the portable electric power supply device 10, and it possible to more reliably start the portable electric power supply device 10.

In addition, although the description has been given of the portable electric power supply device 10 including both of a system that supplies the electric power of the EV driving battery 51 to the interface 19 and the connection plug 12 via the first power cable 11, the built-in charger 17, and the built-in battery 18, and a system that supplies the electric power of the auxiliary machine battery 54 to the interface 19 and the connection plug 12 via the second power cable 41, it is also possible to adopt the portable electric power supply device including a system that supplies the electric power of the driving battery 51 to the interface 19 and the connection plug 12 via the first power cable 11 the built-in charger 17 and the built-in battery 18. Even in such a portable electric power supply device, the same working effect as that of the portable electric power supply device 10 mentioned above. Furthermore, in the portable electric power supply device, by jointly using the primary battery, it is possible to secure a backup power source of the electric power supplied from the built-in battery to the interface and the connection plug, and it is possible to more reliably start the device.

Although, the starting power securing structure of the portable electric power supply device including a conveying instrument has been described above, it is also possible to adopt a starting power securing structure of the electric power supply device that does not include the conveying instrument.

Although the description has been given of the starting power securing structure of the portable electric power supply device 10 including the DC/AC inverter 14 that performs the DC/AC invert of the input electric power and lowers the voltage, it is also possible to adopt a starting power securing structure of the portable electric power supply device including a DC/DC inverter that lowers the voltage of the input electric power and the DC/AC inverter that inverts the direct current electric power into the alternating electric current electric power. Even in the starting power securing structure of the portable electric power supply device, the same effect as that of the starting power securing structure of the portable electric power supply device mentioned above is exhibited.

Although the description has been given of a case where the electric power of the EV driving battery 51 of the electric vehicle 50 is utilized as a general home electrical power supply source using the portable electric power supply device 10, it is also possible to use the electric power of the vehicle driving battery of a plug-in hybrid vehicle that is able to jointly use an electric motor and an internal combustion engine as the drive source of the vehicle using the portable electric power supply device 10 mentioned above and store the vehicle driving battery by the electric power supply from the vehicle outside, as a general home electrical power supply source.

Although the starting power securing structure of the portable electric power supply device 10 has been described above which performs the DC/AC invert of the electric power transmitted from the electric vehicle 50, lowers the voltage, and outputs the electric power from the AC 100V receptacle 15 to the outside, it is possible to adopt a starting power securing structure of the portable electric power supply device which inverts the electric power transmitted from the electric vehicle via the electric power input portion, lowers the voltage thereof, and outputs the electric power from the AC 100V receptacle (the electric power output portion) to the outside, it is possible to provide the starting power securing structure of the portable electric power supply device that includes a power cable in which the connection plug (the vehicle side connection plug) connectable to the charging connector of the electric vehicle is provided at one end thereof, and the connection portion connectable to the electric power input portion is provided at the other end thereof. Even in the starting electric power source securing structure of the portable electric power supply device, the same working effect as that of the starting power securing structure of the portable electric power supply device mentioned above is exhibited.

Figure 3:
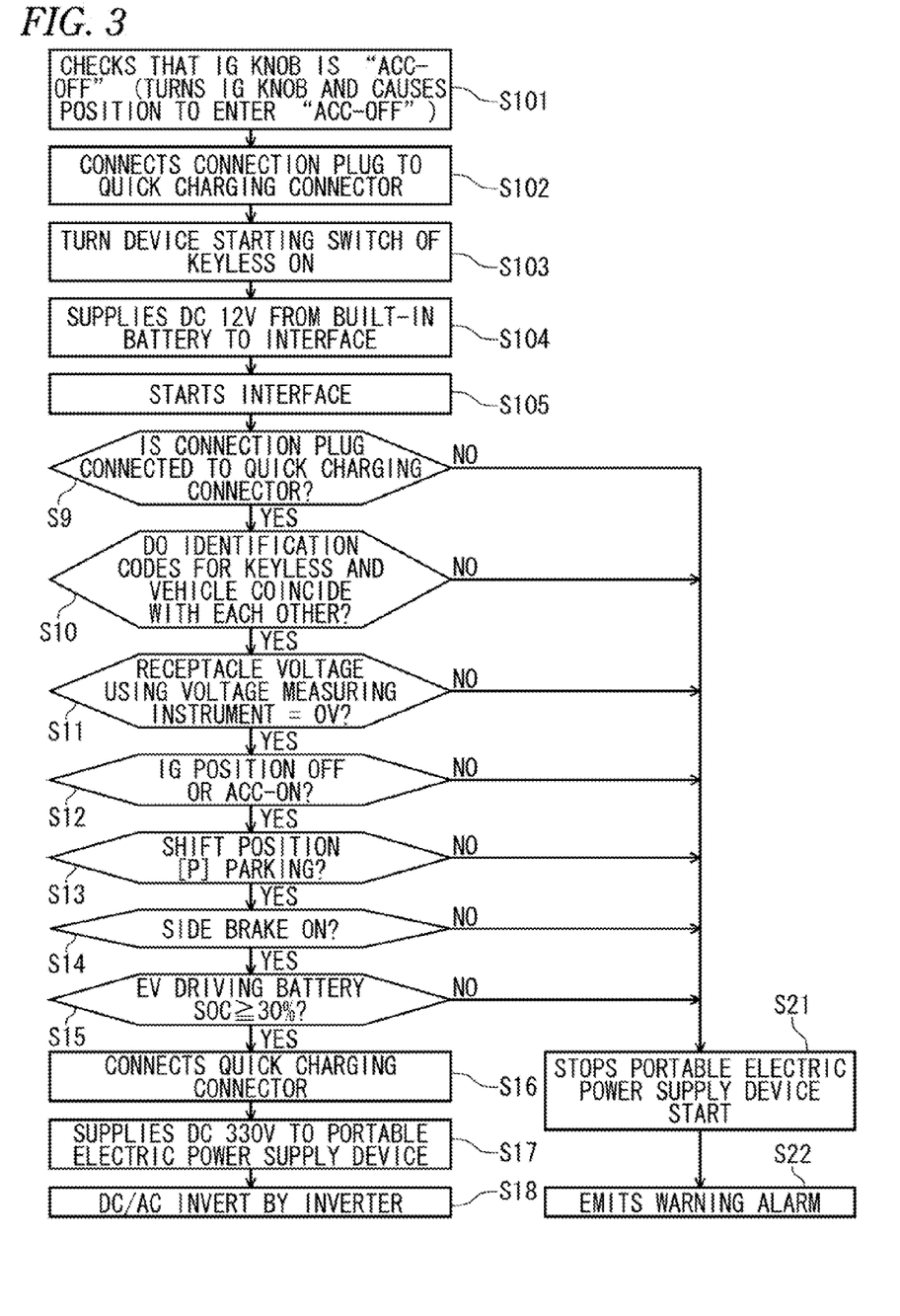
FIG. 3 is a diagram that shows a control flow using the starting power securing structure of the portable electric power supply device according to a second embodiment of the present invention.

A starting power securing structure of a portable electric power supply device according to a second embodiment of the present invention will be described with reference to FIGS. 1 and 3. As the second embodiment, in a configuration of the starting power securing structure of the portable electric power supply device according to the first embodiment mentioned above, the starting control flow will be described in a case where the electric power is supplied from the built-in battery 18 of the portable electric power supply device 10 to the interface 19. Firstly, a person (a user) who uses the portable electric power supply device 10 checks whether the position of an ignition knob (not shown) of the electric vehicle 50 is in an ACC-OFF. In a case where the position is in the ACC-OFF, the state is maintained, and in case where the position is in the ACC-ON, the ignition knob is turned to make the position thereof enter the ACC-OFF (a step S101).

Next, the connection plug 12 of the first electric power cable 11 is connected to the quick charging connecter 53 of the electric vehicle 50 (a step S102).

Next, the starting switch of the portable electric power supply device in the keyless operation key 57 is turned ON (a step S103). As a result, the keyless operation key 57 wirelessly transmits the starting signal including the identification code of the keyless operation key 57 to the electric vehicle 50. The keyless radio wave receiver 55 receives the starting signal and transmits the starting signal to the EV-ECU 56.

Next, the electric power of DC 12V is supplied from the built-in battery 18 to the interface 19 (a step S104). As a result, the interface 19 is started a step S105). The start (the step S105) of the interface 19 corresponds to the start (the step S8) of the interface 19 in the first embodiment mentioned above, the control flow mentioned below is the same as the "first embodiment" (FIG. 2), and the description thereof will be omitted.

As mentioned above, according to the starting power securing structure of the portable electric power supply device relating to the second embodiment, the built-in battery 18, the interface 19 and the connection plug 12 are electrically connected by the DC 12V line 25 and the DC 12V line 26, and the electric power of the built-in battery 18 is supplied to the interface 19 and the connection plug 12. Thus, the electric power is supplied to the quick charging contactor 52 via the connection plug 12, the quick charging connector 53, and the DC 12V line 63 while the DC/AC inverter 14 can be operated, the quick charging contactor 52 forms the closed circuit between the EV driving battery 51 and the quick charging connector 53, and it is possible to transmit the electric power of the EV driving battery 51 to the portable electric power supply device 10 via the quick charging connector 53. In this manner, it is possible to secure the power source for starting the portable electric power supply device 10, and it is possible to more reliably start the portable electric power supply device 10.

Since the starting power securing structure of electric power supply device according to the present invention is able to secure the power source for operating the device and more reliably start the device, the structure can be extremely usefully used in an automobile industry, an outdoor leisure industry, a disaster prevention industry or the like.

What is claimed is:

1. An electric power supply device adapted to be connected to a charging connector of an electric vehicle, comprising:
    a housing;
    a first power cable, extending from the housing, and including a first connection plug configured to be connected to the charging connector;
    an electric power invert portion, provided in the housing, and configured to perform a DC/AC invert of an electric power supplied from the electric vehicle via the first power cable and to lower a voltage of the electric power;
    an electric power output portion, provided in the housing, and configured to output the electric power from the electric power invert portion;
    an operation control portion, provided in the housing, and configured to control an operation of the electric power invert portion; and
    a built-in battery, provided in the housing, and configured to store an electric power of the lower-voltage electric current of DC, and to supply the electric power stored in the built-in battery to the operation control portion and the first connection plug in a state of being electrically connected to the operation control portion and the first connection plug, whereby the electric power invert portion becomes performable, the electric power is supplied to a discharging control portion of the electric vehicle via the first connection plug, and the discharging control portion is performed by the electric power so that the electric power can be transmitted from the electric vehicle to the electric power supply device.

2. The electric power supply device according to claim 1, further comprising:
    a second power cable including a second connection plug configured to be connected to an interior electric power output portion provided in an interior of the electric vehicle,
    wherein the operation control portion and the first connection plug are configured to be electrically connected to the electric vehicle via the second power cable,
    in a case where a voltage of the built-in battery is higher than or equal to a voltage of an auxiliary machine battery of the electric vehicle, the electric power of the built-in battery is supplied to the operation control portion and the first connection plug, and
    in a case where the voltage of the built-in battery is lower than the voltage of the auxiliary machine battery, an electric power of the auxiliary machine battery is supplied to the operation control portion and the first connection plug.

3. The electric power supply device according to claim 2,
    wherein the built-in battery is configured to be electrically connected to the auxiliary machine battery via the second power cable, and
    the built-in battery is configured to be charged by the electric power of a driving battery of the electric vehicle via the first power cable or charged by the electric power of the auxiliary machine battery via the second power cable.

4. The electric power supply device according to claim 2, further comprising:
    an electric power line electrically connecting the built-in battery with the operation control portion and the first connection plug,
    wherein the second power cable is electrically connected to the electric power line.

5. The electric power supply device according to claim 4, wherein the electric power line is stored in the first power cable.

6. The electric power supply device according to claim 4, further comprising:
    a diode provided between the second connection plug and a connection location where the second power cable is electrically connected to the electric power line.

7. A starting power securing structure of an electric power supply device which includes an electric power invert portion that performs a DC/AC invert of the electric power supplied from an electric vehicle via a first power cable provided with a first connection plug connectable to a charging connector of the electric vehicle and lowers a voltage of the electric power, and an electric power output portion that outputs the electric power subjected to the DC/AC invert and the voltage drop to an outside, the structure comprising:
- a housing of the electric power supply device;
- a built-in battery provided in the housing and configured to store an electric power of the lower-voltage electric current of DC;
- an operation control portion provided in the housing and configured to control an operation of the electric power invert portion; and
- a discharging control portion provided in the electric vehicle and configured to control a discharging of a driving battery mounted on the electric vehicle to the charging connector,
- wherein the built-in battery is configured to supply the electric power stored in the built-in battery to the operation control portion and the first connection plug in a state of being electrically connected to the operation control portion and the first connection plug, whereby the electric power is supplied to the discharging control portion via the first connection plug, the discharging control portion is performed by the electric power, and the electric power invert portion become performable so that the electric power can be transmitted from the electric vehicle to the electric power supply device.

8. The starting power securing structure of the electric power supply device according to claim 7, further comprising:
- a second power cable provided with a second connection plug configured to be connected to an interior electric power output portion which outputs an electric power stored in an auxiliary machine battery mounted on the electric vehicle to an interior of the electric vehicle,
- wherein the auxiliary machine battery is configured to be electrically connected to the operation control portion and the first connection plug via the second power cable,
- in a case where a voltage of the built-in battery is higher than or equal to a voltage of the auxiliary machine battery, the electric power of the built-in battery is supplied to the operation control portion and the first connection plug, and
- in a case where the voltage of the built-in battery is lower than a voltage of the auxiliary machine battery, the electric power of the auxiliary machine battery is supplied to the operation control portion and the first connection plug.

9. The starting power securing structure of the electric power supply device according to claim 8,
- wherein the auxiliary machine battery is configured to be electrically connected to the built-in battery via the second power cable, and
- the built-in battery is configured to be charged by an electric power of a driving battery via the first power cable or charged by the electric power of the auxiliary machine battery via the second power cable.

10. The starting power securing structure of the electric power supply device according to claim 8, further comprising:
- an electric power line electrically connecting the built-in battery with the operation control portion and the first connection plug,
- wherein the second power cable is electrically connected to the electric power line.

11. The starting power securing structure of the electric power supply device according to claim 10,
- wherein the electric power line is stored in the first power cable.

12. The starting power securing structure of the electric power supply device according to claim 10, further comprising:
- a diode provided between the second connection plug and a connection location where the second power cable is electrically connected to the electric power line.

* * * * *